Oct. 23, 1951    N. O. W. MULSOW    2,572,653
FISH STRINGER
Filed Jan. 25, 1949
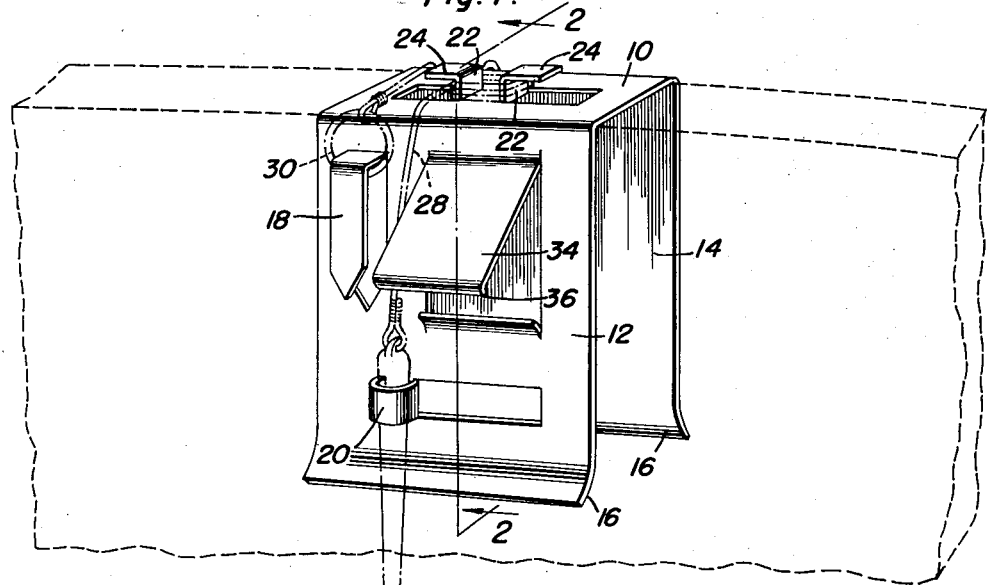
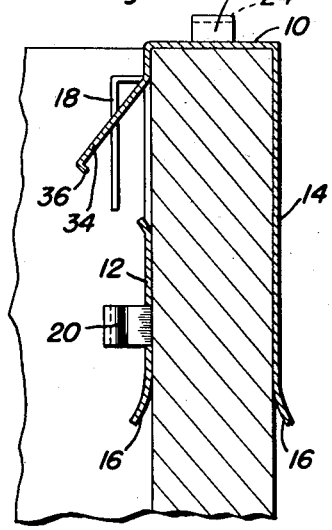
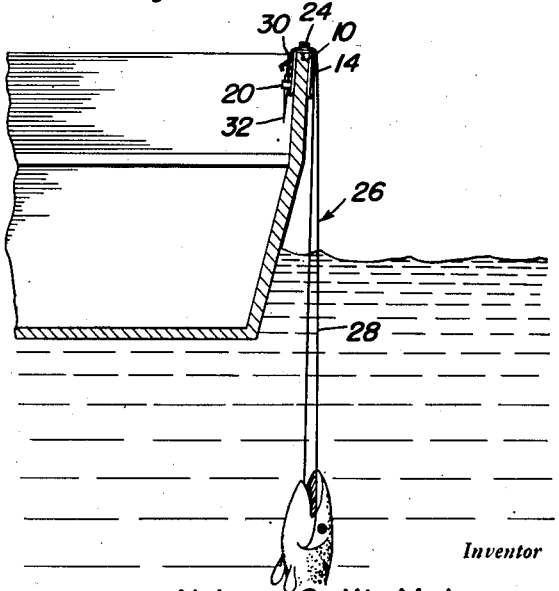
Inventor
Nelson O. W. Mulsow

Patented Oct. 23, 1951

2,572,653

UNITED STATES PATENT OFFICE 2,572,653

FISH STRINGER

Nelson O. W. Mulsow, Marlin, Tex.

Application January 25, 1949, Serial No. 72,688

5 Claims. (Cl. 224—7)

This invention relates to a fish stringer and has for its primary object to support a catch of fish over the side of a boat and at the desired depth.

Fish stringers of the type to which this invention relates have heretofore been developed as is exemplified by Patents 2,437,331; 849,410; and 1,000,756. Such devices serve admirably for the purpose intended, but do not provide for adjusting the depth to which the catch may be supported beneath the surface of the water.

Accordingly, one of the major objects of this invention is to suspend the catch at the desired depth beneath the surface of the water.

The above and other objects may be attained by employing this invention which embodies among its features a plate adapted to overlie the top edge of the gunwale or transom of a boat, a depending leg extending downwardly from each side edge of said plate, said legs forming with the plate a substantially inverted, U-shaped, resilient clip of which the plate forms the bight portion, a downwardly extending hook carried by one of the legs adjacent its junction with the plate for holding the ring carried by a conventional fish stringing line, an eye carried by said leg remote from the hook for supporting the spike or needle carried by a conventional fish stringing line, upwardly and outwardly extending ears carried by the plate substantially midway between opposite ends thereof, said ears cooperating to form a line holding cleat around which the fish stringing line may be wrapped, and a latch plate struck from the inner leg portion and extending downwardly and outwardly therefrom, the plate and the inner leg portion forming a line securing constriction therebetween.

In the drawings,

Figure 1 is a perspective view of a device for securing a fish stringing line to a boat, the fish stringer being shown in broken lines;

Figure 2 is a vertical sectional view taken substantially along the line 2—2 of Figure 1; and Figure 3 is a fragmentary sectional view through a boat showing this improved fish stringer and line anchoring device in use.

Referring to the drawings in detail, a plate 10 of a width substantially equal to the width of a conventional gunwale or transom is provided along opposite side edges with depending legs 12 and 14, the lower ends of which are turned outwardly as at 16 to form guiding surfaces in positioning the device on a boat. The arms or legs 12 and 14 are preferably arranged in slightly convergent planes to form resilient grips for opposite sides of the gunwale or transom of the boat in order frictionally to engage said sides and hold the device in place.

The leg 12 is provided with a hook 18 which is preferably located near the junction of the leg 12 with the plate 10, and adjacent one side edge of the leg 12, and carried by the leg 12 remote from the hook 18 is an eye 20 which forms a support for the needle or spike of the stringer. Extending upwardly from the plate 10 in spaced parallel relation are ears 22, the upper ends of which are turned outwardly, as at 24, so as to lie in substantially spaced parallel relation with the top of the plate 10, and form, in cooperation, a line-holding cleat such as is commonly employed in the nautical arts.

The device just described is primarily adapted for use with a conventional fish-stringer designated generally 26 which comprises a conventional line 28 which carries at one end a conventional ring 30, and at its opposite end a conventional needle or spike 32.

Should it be so desired, the leg 12 may also be provided with a downwardly and outwardly inclined flange 34, comprising a latch plate cooperating with the leg 12 to form a line securing constriction therebetween, the lower outer edge of which is provided with an inturned hook 36 which may serve as a bottle opener.

In use, the fish stringer holder is clipped over the side of a boat as suggested in the drawings so that the plate 10 will overlie the top edge of the gunwale or transom of a boat with the legs 12 and 14 embracing opposite sides thereof frictionally to hold the device in place. When it is desired to suspend a string of fish over the side of the boat, the fish are strung on the stringer in the conventional manner by passing the needle or spike through the gill and mouth of the fish. After the catch has been made and the fish strung on the stringer, it is obvious that by engaging the ring 30 with the hook 18 as illustrated in Figure 1, the string adjacent the end carrying the spike or needle 32 may be wound around the ears 22 in the manner of winding a line or hauser about a cleat, in order to regulate the depth to which the catch is held below the surface of the water. After so winding the stringer line, the spike or needle 32 is supported in the eye 20 from which it may be easily and quickly detached when it is desired to place additional fish on the string. Obviously, when additional fish are to be placed on the stringer, the needle or spike may be disengaged from the eye and by unwinding the stringing line that has been wound about the ears 22, the additional catch may be threaded on to the stringer and by taking a few turns about the ears 22, the depth to which the catch is supported beneath the surface of the water may be regulated. At the same time, by reason of the fact that one end of the stringing line is anchored to the hook 18 by way of the ring 30, and the portion of the line remote from the ring is wound about the ears 22, it is evident that the depth to which the fish catch is suspended may be varied to suit the desires of the user.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. In a fish stringer of the type which includes a stringing line, a ring carried by one end of the line and a spike or needle carried by the opposite end of the line, means for securing the stringing line to a boat and holding the catch at the desired depth over the side of the boat comprising a plate adapted to overlie the top edge of the gunwale or transom of a boat, a depending leg extending downwardly from each side edge of said plate, said legs forming with the plate a substantially inverted U-shaped resilient clip of which the plate forms the bight portion, a downwardly extending hook carried by one of the legs adjacent its junction with the plate for holding the ring carried by the stringer, an eye carried by said leg remote from the hook for supporting the spike or needle, and upwardly and outwardly extending ears carried by the plate substantially midway between opposite ends thereof, said ears cooperating to form a line-holding cleat around which the stringing line may be wrapped.

2. A fish stringer comprising a plate bent intermediate its ends to form a resilient U-shaped clamp having a web portion and depending leg portions, an ear struck outwardly from said inner leg portion and having a laterally offset downwardly extending finger paralleling said inner leg portion, said ear being adapted to receive the ringed end of a stringer, a lug struck upwardly from said web portion and having a laterally offset integral extension paralleling said web portion, said lug and extension providing a line winding cleat, a resilient loop struck from said inner leg portion for detachably receiving the spiked end of a fish stringer.

3. A fish stringer comprising a plate bent intermediate its ends to form a resilient U-shaped clamp having a web portion and depending leg portions, an ear struck outwardly from said inner leg portion and having a laterally offset downwardly extending finger paralleling said inner leg portion, said ear being adapted to receive the ringed end of a stringer, a lug struck upwardly from said web portion and having a laterally offset integral extension paralleling said web portion, said lug and extension providing a line winding cleat, a resilient loop struck from said inner leg portion for detachably receiving the spiked end of a fish stringer, a latch plate struck from said inner leg portion and extending downwardly and outwardly therefrom, said plate and said inner leg portion forming a line securing constriction therebetween.

4. A fish stringer comprising a plate bent intermediate its ends to form a resilient U-shaped clamp having a web portion and depending leg portions, an ear struck outwardly from said inner leg portions and having a laterally offset downwardly extending finger paralleling said inner leg portion, said ear being adapted to receive the ringed end of a stringer, a pair of lugs struck upwardly from said web portion, each having laterally offset integral arms paralleling said web portion, said arms extending in opposite directions, said lugs and arms forming a line winding cleat, a resilient loop struck from said inner leg portion for detachably receiving the spiked end of a fish stringer.

5. A fish stringer comprising a plate bent intermediate its ends to form a resilient U-shaped clamp having a web portion and depending leg portions, an ear struck outwardly from said inner leg portions and having a laterally offset downwardly extending finger paralleling said inner leg portion, said ear being adapted to receive the ringed end of a stringer, a pair of lugs struck upwardly from said web portion, each having laterally offset integral arms paralleling said web portion, said arms extending in opposite directions, said lugs and arms forming a line winding cleat, a resilient loop struck from said inner leg portion for detachably receiving the spiked end of a fish stringer, a latch plate struck from said inner leg portion and extending downwardly and outwardly therefrom, said plate and said inner leg portion forming a line securing constriction therebetween.

NELSON O. W. MULSOW.

REFERENCES CITED

The following references are of record in the file of this patent:

UNITED STATES PATENTS

| Number | Name | Date |
|---|---|---|
| 849,410 | Mills | Apr. 9, 1907 |
| 1,000,756 | Roberts | Aug. 15, 1911 |
| 2,437,331 | Murray et al. | Mar. 9, 1948 |